(12) United States Patent
Ju

(10) Patent No.: US 11,913,339 B2
(45) Date of Patent: Feb. 27, 2024

(54) SEALING ASSEMBLY AND TURBOMACHINE INCLUDING SAME

(71) Applicant: DOOSAN ENERBILITY CO., LTD., Changwon (KR)

(72) Inventor: Eui Jun Ju, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/813,623

(22) Filed: Jul. 20, 2022

(65) Prior Publication Data

US 2023/0096973 A1 Mar. 30, 2023

(30) Foreign Application Priority Data

Sep. 29, 2021 (KR) ........................ 10-2021-0128698

(51) Int. Cl.
*F16J 15/44* (2006.01)
*F01D 11/00* (2006.01)
(Continued)

(52) U.S. Cl.
CPC .............. *F01D 11/006* (2013.01); *F16J 9/14* (2013.01); *F16J 15/067* (2013.01); *F16J 15/188* (2013.01); *F16J 15/442* (2013.01); *F01D 11/003* (2013.01); *F01D 11/005* (2013.01); *F05D 2240/14* (2013.01); *F05D 2240/55* (2013.01)

(58) Field of Classification Search
CPC .... F01D 11/001; F01D 11/003; F01D 11/005; F01D 25/246; F04D 29/083; F04D 29/161; F04D 29/164; F05D 2240/55; F16J 15/441; F16J 15/442; F16J 15/067; F16J 15/188; F16J 9/12; F16J 9/14
See application file for complete search history.

(56) References Cited

U.S. PATENT DOCUMENTS 3,575,424 A * 4/1971 Taschenberg .......... F16J 15/442
277/411
4,449,721 A 5/1984 Tsuge
(Continued)

FOREIGN PATENT DOCUMENTS

CN 107939455 A * 4/2018
CN 107939455 A 4/2018
(Continued)

OTHER PUBLICATIONS

CN-107939455-Translation from Espacenet (Year: 2018).*

*Primary Examiner* — Justin D Seabe
*Assistant Examiner* — Behnoush Haghighian
(74) *Attorney, Agent, or Firm* — Harvest IP Law, LLP

(57) ABSTRACT

A sealing assembly and a turbomachine including the sealing assembly are provided. The sealing assembly includes a sealing body configured to be inserted into an insertion hole of a second component adjacent to a first component, and a sealing protrusion, formed on one circumferential side of the sealing body, protruding toward one circumferential direction from the sealing body and configured to be inserted into a sealing groove formed on the other circumferential side of a sealing body of the first adjacent sealing assembly, the sealing body of the first adjacent sealing assembly being adjacent to the sealing body in a circumferential direction.

17 Claims, 6 Drawing Sheets

(51) Int. Cl.
  *F16J 9/14* (2006.01)
  *F16J 15/06* (2006.01)
  *F16J 15/18* (2006.01)

(56) References Cited

U.S. PATENT DOCUMENTS

| | | | | |
|---|---|---|---|---|
| 8,177,237 | B2* | 5/2012 | Lindner-Silwester | F16J 9/18 |
| | | | | 277/435 |
| 8,888,441 | B2* | 11/2014 | Jordy | F01D 11/02 |
| | | | | 415/230 |
| 9,551,224 | B2* | 1/2017 | Onishi | F01D 9/042 |
| 10,001,190 | B2* | 6/2018 | Funato | F16F 9/58 |
| 11,525,515 | B2* | 12/2022 | Zimmitti | F16J 15/26 |
| 11,549,444 | B2* | 1/2023 | Beinor | F02C 7/28 |
| 2006/0038355 | A1 | 2/2006 | Nakaoka | |
| 2009/0179386 | A1* | 7/2009 | Lindner-Silwester | F16J 9/18 |
| | | | | 277/486 |
| 2011/0135445 | A1 | 6/2011 | Turnquist | |
| 2011/0278799 | A1* | 11/2011 | Seki | F16J 15/3272 |
| | | | | 277/408 |
| 2013/0034428 | A1* | 2/2013 | Jordy | F16J 15/442 |
| | | | | 415/173.1 |
| 2013/0149125 | A1* | 6/2013 | Onishi | F01D 11/001 |
| | | | | 415/191 |
| 2015/0115542 | A1* | 4/2015 | Neumann | F16J 15/16 |
| | | | | 277/546 |
| 2017/0016507 | A1* | 1/2017 | Funato | F16F 9/58 |
| 2017/0307085 | A1* | 10/2017 | Haynes | F16J 15/26 |
| 2019/0195363 | A1* | 6/2019 | Shimizu | F02F 5/00 |
| 2021/0246987 | A1* | 8/2021 | Zimmitti | F16J 15/442 |
| 2022/0252013 | A1* | 8/2022 | Beinor | F16J 15/442 |
| 2022/0290761 | A1* | 9/2022 | Sihra | F16J 15/442 |

FOREIGN PATENT DOCUMENTS

| | | |
|---|---|---|
| EP | 2381144 A1 | 10/2011 |
| EP | 2827027 A1 | 1/2015 |
| KR | 102291086 B1 | 8/2021 |
| WO | 2012117987 A1 | 9/2012 |

* cited by examiner

[Fig. 1]
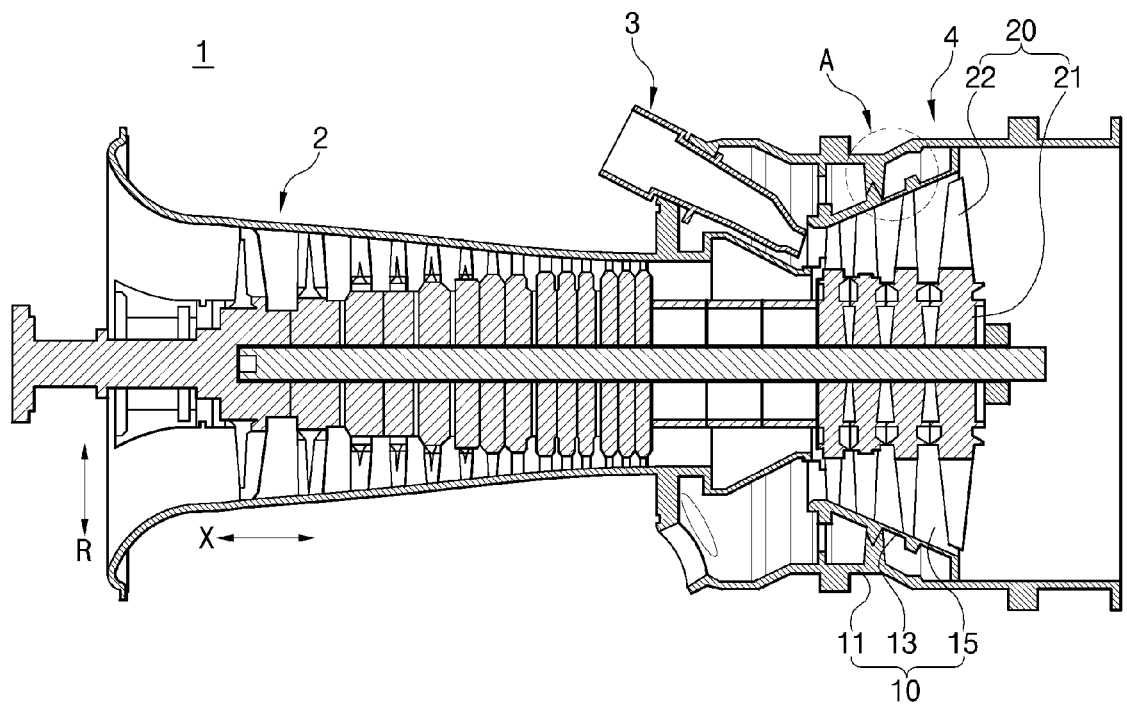

[Fig. 2]
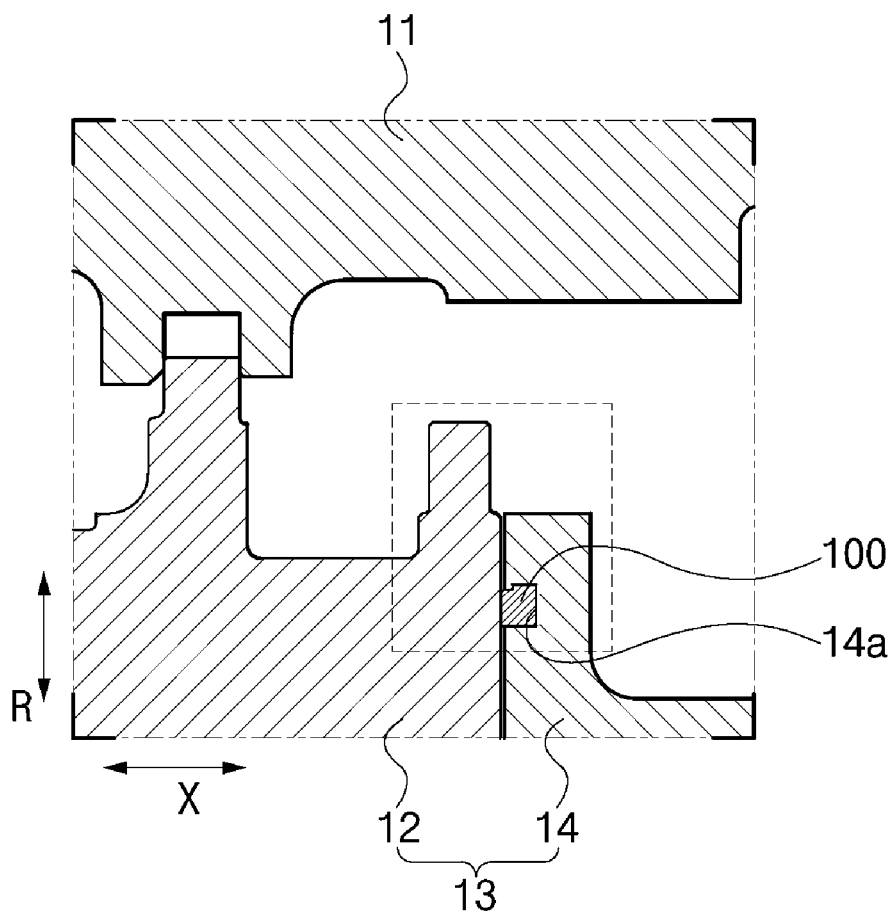

[Fig. 3]
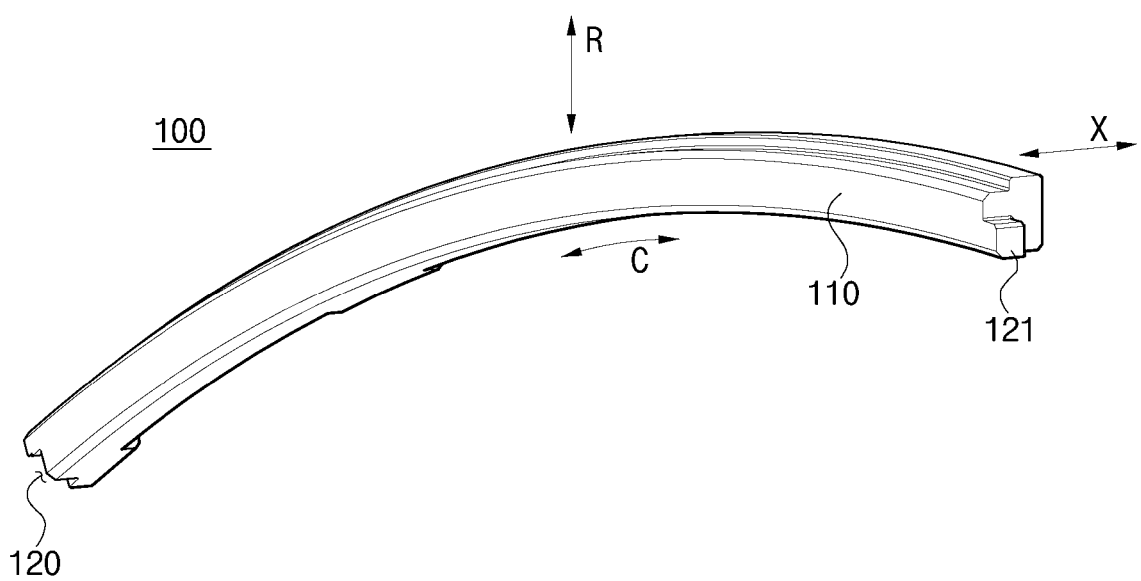

[Fig. 4]
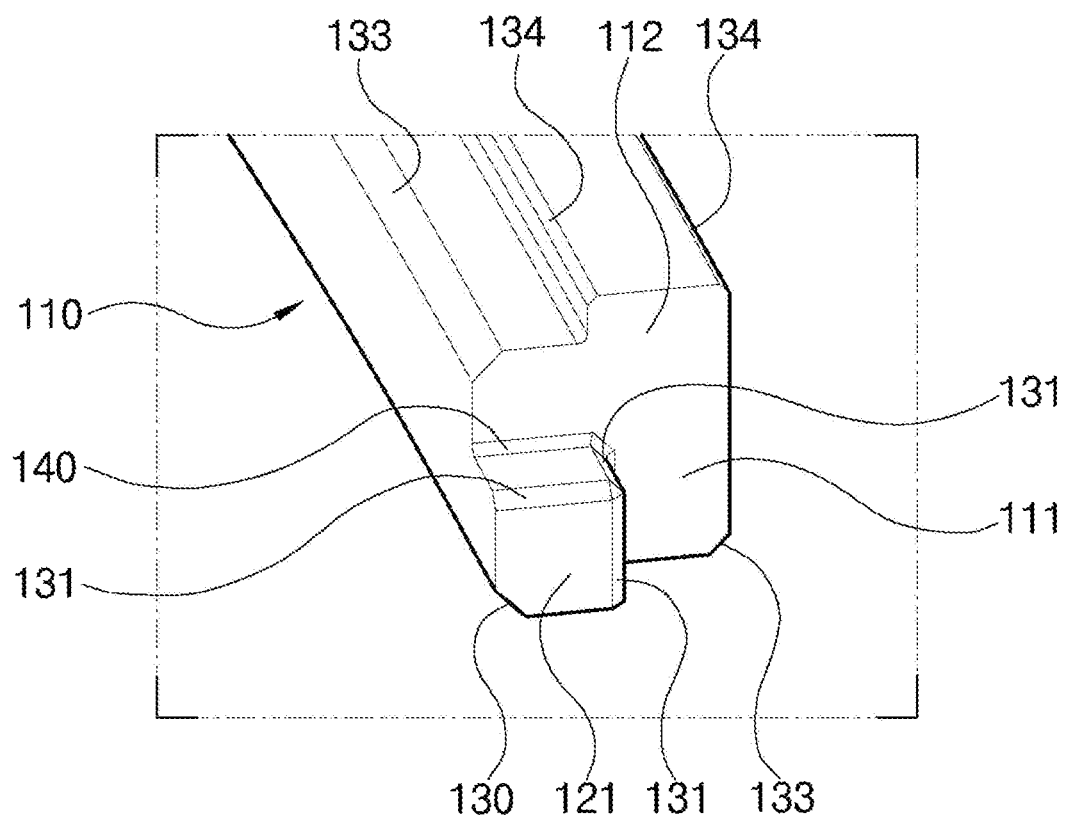

[Fig. 5]
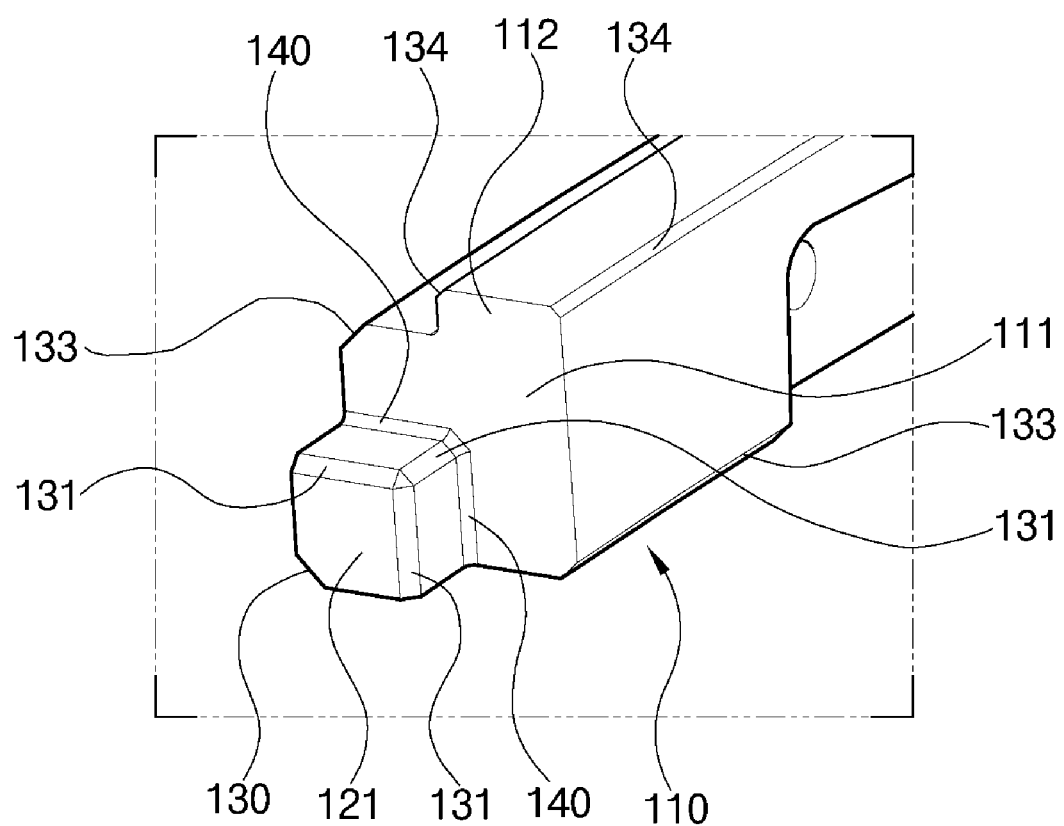

[Fig. 6]
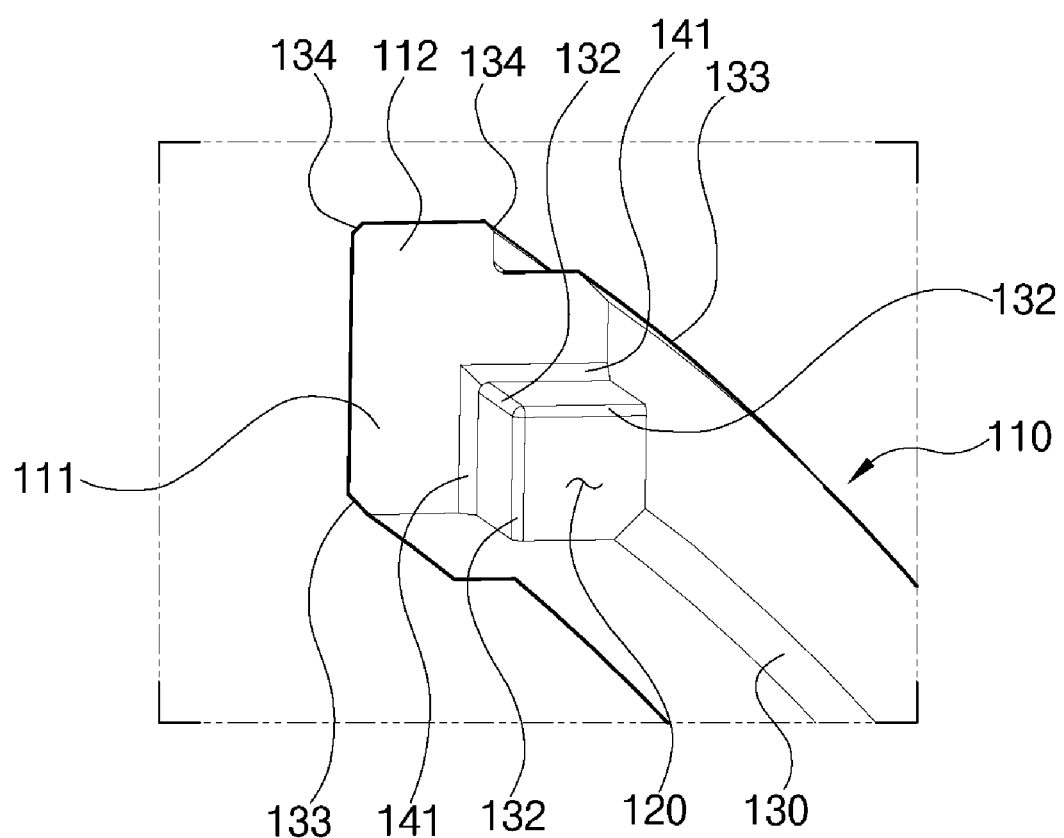

SEALING ASSEMBLY AND TURBOMACHINE INCLUDING SAME

CROSS REFERENCE TO RELATED APPLICATION

The present application claims priority to Korean Patent Application No. 10-2021-0128698, filed on Sep. 29, 2021, the entire contents of which are incorporated herein for all purposes by this reference.

BACKGROUND OF THE INVENTION

1. Field of the Invention

The present disclosure relates to a sealing assembly and a turbomachine including the same, and more particularly, to a sealing assembly sealing a space between a first component and a second component provided in a turbomachine, and a turbomachine including the same.

2. Description of the Background Art

A turbomachine refers to an apparatus that generates power for power generation through a fluid (particularly, for example, gas) passing through the turbomachine. Therefore, the turbomachine is usually installed and used together with a generator. Such a turbomachine may include a gas turbine, a steam turbine, a wind power turbine, and the like. The gas turbine is an apparatus that mixes compressed air and natural gas and combusts an air-fuel mixture to generate combustion gas, which in turn generates power for power generation. The steam turbine is an apparatus that heats water to generate steam, which in turn generates power for power generation. The wind turbine is an apparatus that converts wind power into power for power generation.

Among the turbomachines, the gas turbine includes a compressor, a combustor, and a turbine. The compressor has a plurality of compressor vanes and compressor blades alternately arranged within a compressor casing. In addition, the compressor sucks external air through a compressor inlet scroll strut. The sucked air is compressed by the compressor vanes and the compressor blades while passing through an interior of the compressor. The combustor receives the compressed air from the compressor and mixes the compressed air with fuel to form a fuel-air mixture. In addition, the combustor ignites the fuel-air mixture with an igniter to generate high-temperature and high-pressure combustion gas. The generated combustion gas is supplied to the turbine. In the turbine, a plurality of turbine vanes and turbine blades are arranged in a turbine casing. The combustion gas generated by the combustor passes through the turbine. While passing through an interior of the turbine, the combustion gas rotates the turbine blades and then is discharged to the outside through a turbine diffuser.

Among the turbomachines, the steam turbine includes an evaporator and a turbine. The evaporator heats water supplied from the outside to generate steam. In the turbine, a plurality of turbine vanes and turbine blades are alternately disposed in a turbine casing, similarly to the turbine in a gas turbine. However, in the turbine in the steam turbine, the steam generated in the evaporator, instead of the combustion gas, passes through the turbine to rotate the turbine blades.

As for the turbine, the turbine includes a turbine stator and a turbine rotor disposed in the turbine stator. Here, the turbine stator includes a turbine casing, a vane carrier disposed radially inside of the turbine casing, and turbine vanes coupled to an inner circumferential surface of the vane carrier. In addition, the turbine rotor includes a turbine disk, and turbine blades coupled to an outer circumferential surface of the turbine disk.

Combustion gas or steam flows into the vane carrier. The flow of combustion gas or steam supplies kinetic energy to rotate the turbine blades assembled to the turbine rotor with the aid of the turbine vanes assembled inside of the vane carrier. Since the efficiency of converting the energy of combustion gas or steam into kinetic energy is inversely proportional to the amount of leakage of the corresponding fluid, leakage other than that through the intended flow path of a fluid in the vane carrier should be minimized. In order to minimize leakage, it is important to more closely seal a gap between the adjacent vane carriers in the axial direction of the turbine casing.

The foregoing is intended merely to aid in the understanding of the background of the present disclosure, and is not intended to mean that the present disclosure falls within the purview of the related art that is already known to those skilled in the art or to limit the scope of the present invention according to the present disclosure.

SUMMARY OF THE INVENTION

The present disclosure provides a sealing assembly capable of more closely sealing a gap between adjacent vane carriers in an axial direction of a turbine casing, and a turbomachine including the same.

According to an aspect of the present disclosure, there is provided a sealing assembly including: a sealing body configured to be inserted into an insertion hole of a second component adjacent to a first component; and a sealing protrusion, formed on one circumferential side of the sealing body, protruding toward one circumferential direction from the sealing body and configured to be inserted into a sealing groove formed on the other circumferential side of a sealing body of an adjacent sealing assembly, the sealing body of the first adjacent sealing assembly being adjacent to the sealing body in a circumferential direction.

According to another aspect of the present disclosure, there is provided a turbomachine including: a stator configured to guide a fluid passing therethrough; and a rotor disposed in the stator configured to rotate with the fluid passing through the stator, wherein the stator includes a casing, first and second vane carriers disposed on a radially inner side of the casing so as to be arranged adjacent to each other along an axial direction of the casing, vanes respectively coupled to inner circumferential surfaces of the first and second vane carriers, and a sealing assembly sealing a gap between the first and second vane carriers, the sealing assembly including: a sealing body configured to be inserted into an insertion hole of a second component adjacent to a first component; and a sealing protrusion, formed on one circumferential side of the sealing body, protruding toward one circumferential direction from the sealing body and configured to be inserted into a sealing groove formed on the other circumferential side of a sealing body of a first adjacent sealing assembly, the sealing body of the first adjacent sealing assembly being adjacent to the sealing body in a circumferential direction.

The sealing protrusion may have a radially outer surface spaced apart inward from a radially outer surface of the sealing body, and a radially inner surface integrally connected to a radially inner surface of the sealing body, a surface thereof facing the first vane carrier may be integrally connected to a surface of the sealing body facing the first vane carrier, a surface thereof facing the second vane carrier may be spaced apart from a surface of the sealing body facing the second vane carrier, and the sealing groove may be disposed, on the other circumferential side of the sealing body, being corresponding and opposite to the sealing protrusion of the sealing body, being configured to receive a sealing protrusion of a second adjacent sealing assembly adjacent to the sealing assembly in the other circumferential direction.

The sealing body and the sealing protrusion may have a first chamfered surface formed at a radially inner edge portion on the first vane carrier side along the circumferential direction.

The sealing protrusion may have a second chamfered surface formed on one edge portion of a radially outer and circumferential end, and the sealing groove may have a third chamfered surface formed at an edge portion of an inner wall corresponding and opposite to the second chamfered surface.

The sealing protrusion may have a first fillet surface formed at a connection portion thereof with the sealing body, and the sealing body may have a second fillet surface formed on a surface thereof on the side where the sealing groove is formed, corresponding and opposite to the first fillet surface.

The sealing body may include a first body part having the sealing protrusion, and a second body part protruding radially outward from the first body part along the circumferential direction, wherein the surface of the second body part facing the first vane carrier is spaced apart from the surface of the first body part facing the first vane carrier and the surface of the second body part facing the second vane carrier side is integrally connected to the surface of the first body part facing the second vane carrier.

The first body part may have fourth chamfered surfaces formed at a radially outer edge portion thereof on the first vane carrier side and a radially inner edge portion thereof on the second vane carrier side, along the circumferential direction, respectively.

The second body part may have a fifth chamfered surface formed at a radially outer edge portion thereof along the circumferential direction.

According to the sealing assembly and the turbomachine including the same, the sealing protrusion is provided on one circumferential side of the sealing body and the sealing groove, into which the sealing protrusion of another sealing body is inserted, is formed on another circumferential side, thereby effectively seal a gap between the first component (first vane carrier) and the second component (second vane carrier) through the coupling structure between the sealing groove and the sealing protrusion.

BRIEF DESCRIPTION OF THE DRAWINGS

FIG. 1 is a cross-sectional view illustrating a gas turbine in a turbomachine;

FIG. 2 is an enlarged view illustrating part A of FIG. 1;

FIG. 3 is a perspective view illustrating a sealing assembly illustrated in FIG. 2;

FIGS. 4 and 5 are enlarged perspective views illustrating a sealing protrusion provided on one circumferential side of the sealing body in FIG. 3; and FIG. 6 is an enlarged perspective view illustrating a sealing groove formed on another circumferential side of the sealing body in FIG. 3.

DETAILED DESCRIPTION OF THE INVENTION

Although the present disclosure will be described with reference to embodiments illustrated in the accompanying drawings, those skilled in the art will understand that these embodiments are merely illustrative, and various modifications and equivalent other embodiments may be possible. Therefore, the true technical scope of the present disclosure should be defined by the technical scope of the appended claims.

Referring to FIG. 1, a gas turbine 1 includes a compressor 2, a combustor 3, and a turbine 4. In a flow direction of gas (compressed air or combustion gas), the compressor 2 is disposed on the upstream side of the gas turbine 1, and the turbine 4 is disposed on the downstream side of the gas turbine. In addition, the combustor 3 is arranged between the compressor 2 and the turbine 4.

The compressor 2 accommodates, inside a compressor casing, compressor vanes and a compressor rotor, and the turbine 4 accommodates, inside a turbine casing 11, turbine vanes 15 and turbine rotors 20. These compressor vanes and the compressor rotors are arranged in a multi-stage along a flow direction of compressed air, and the turbine vanes 15 and the turbine rotors 20 are also arranged in a multi-stage along a flow direction of combustion gas. In details, the compressor 2 has an internal space of which volume decreases from the front-stage toward the rear-stage so that the intake air can be compressed. In contrast, the turbine 4 has an internal space of which volume increases from the front-stage toward the rear-stage so that the combustion gas supplied from the combustor can expand.

Between the compressor rotor located on the rear end side of the compressor 2 and the turbine rotor 20 located on the front end side of the turbine 4, a torque tube is disposed as a torque transmission member to transmit the rotational torque generated by the turbine 4 to the compressor 2. Although the torque tube may be composed of a plurality of torque tube disks arranged in three stages in total as illustrated in FIG. 1, this is only one of several embodiments of the present disclosure, so the torque tube may be composed of a plurality of torque tube disks arranged in four or more stages or two or less stages.

The compressor rotor includes a compressor disk and a compressor blade. A plurality of (e.g., 14) compressor disks are provided inside the compressor casing, and the respective compressor disks are fastened so as not to be spaced apart in the axial direction by a tie rod. More specifically, the respective compressor disks are aligned along the axial direction with the tie rod passing through the central portion thereof. In addition, adjacent compressor disks are arranged such that the opposing surfaces of the adjacent compressor disks are compressed by the tie rod so that the adjacent compressor disks cannot rotate relative to each other.

The plurality of compressor blades is radially coupled to an outer circumferential surface of the compressor disk in a multi-stage. Further, the plurality of compressor vanes is arranged in a multi-stage on an inner circumferential surface of the compressor casing such that each stage of compressor vanes is disposed between adjacent stages of compressor blades. Unlike the compressor disk, the compressor vanes maintain a fixed state so as not to rotate, and serve to guide the compressed air, which passed through an upstream-side stage of compressor blades, to a downstream-side stage of compressor blades. Here, the compressor casing and the compressor vanes may be collectively defined as a compressor stator to distinguish them from the compressor rotor.

The tie rod is arranged to penetrate the center of the plurality of compressor disks and turbine disks, which will be described later, such that one end thereof is fastened in the compressor disk located on the foremost end side of the compressor and the other end thereof is fastened by a fastening nut.

Since the tie rod may be formed in various structures depending on the gas turbine, the shape of the tie rod is not necessarily limited to the shape illustrated in FIG. 1. That is, as illustrated, one tie rod may have a form in which the tie rod passes through the central portion of the compressor disks and the turbine disks, the form in which the plurality of tie rods are arranged in a circumferential manner, or a combination thereof.

Although not illustrated, the compressor of the gas turbine may be provided with a deswirler that serves as a guide for increasing a pressure of fluid and adjusting a flow angle of the fluid entering a combustor inlet to a designed flow angle.

The combustor 3 serves to mix an incoming compressed air with fuel and combust the air-fuel mixture to produce high-temperature, high-pressure combustion gas with high energy, thereby raising the temperature of the combustion gas up to the heat-resistant limit of the combustor and turbine parts through an isothermal combustion process.

The plurality of combustors may be arranged in combustor casings formed in cell shapes to constitute a combustion system of the gas turbine 1, wherein each of the combustors includes a nozzle for injecting fuel, a liner for forming a combustion chamber, and a transition piece that is a connection part between the combustor and the turbine.

Specifically, the liner provides a combustion space in which fuel injected from a fuel nozzle is mixed with compressed air from the compressor and burned. The liner includes a combustion chamber that provides the combustion space in which the fuel mixed with air is burned, and an annular flow path that forms an annular space while surrounding the combustion chamber. In addition, the fuel injection nozzle is coupled to the front side of the liner, and an igniter is coupled to the sidewall of the liner.

In the liner annular flow path, compressed air introduced through a plurality of holes provided in an outer wall of the liner flows, and the compressed air that cooled the transition piece to be described later also flows. As such, as the compressed air flows along the outer wall of the liner, it is possible to prevent the liner from being thermally damaged by heat generated by the combustion of fuel in the combustion chamber.

The transition piece is connected to the rear side of the liner so that the combustion gas burned by an ignition plug can be transferred to the turbine side. Similar to the liner, the transition piece has an annular flow path surrounding an inner space of the transition piece is formed. As the compressed air flows along the annular flow path, the outer wall of the transition piece is cooled to prevent damage due to high temperature of the combustion gas.

Meanwhile, the high-temperature and high-pressure combustion gas from the combustor 3 is supplied to the turbine 4 described above. The high-temperature and high-pressure combustion gas supplied to the turbine 4 expands while passing through the inside of the turbine 4, and accordingly, impulses and reaction forces are applied to the turbine blades 22, which will be described later, to generate rotational torque. The resultant rotational torque is transmitted to the compressor through the above-described torque tube, and an excess of the power required to drive the compressor is used to drive a generator or the like.

The turbine 4 is fundamentally similar to the structure of a compressor 2. That is, the turbine 4 is also provided with a plurality of turbine rotors 20 similar to the compressor rotor of the compressor. Thus, the turbine rotor 20 includes a turbine disk 21 and a plurality of turbine blades 22 radially disposed around the turbine disk. The plurality of turbine vanes 15 are annually arranged based on the same stage on the turbine casing 11 between turbine blades 22 to guide a flow direction of the combustion gas, which passed through the turbine blades 22. Here, the turbine casing 11 and the turbine vanes 15 may be collectively defined as a turbine stator 10 to distinguish them from the turbine rotor 20.

Hereinafter, for convenience of description, reference numeral C denotes a circumferential direction of the turbine casing 11, reference numeral R denotes a radial direction of the turbine casing 11, and reference numeral X denotes a direction of a rotation axis of the turbine casing 11. Here, reference numeral X also denotes the longitudinal direction of the tie rod illustrated in FIG. 1.

Referring to FIG. 2, the turbine stator 10 further includes a vane carrier 13 and a sealing assembly 100, in addition to the turbine casing 11 and the turbine vane 15.

The vane carrier 13 includes a first vane carrier 12 and a second vane carrier 14 disposed axially (in the axial direction X) adjacent to each other on a radially (in the radial direction R) inner side of the turbine casing 11. In addition, the turbine vanes 15 are coupled to inner circumferential surfaces of the first vane carrier 12 and the second vane carrier 14, respectively.

The sealing assembly 100 is provided to seal a gap between a first component and a second component. In an embodiment of the present disclosure to be described below, a description will be made of the case in which the first component and the second component are the first vane carrier 12 and the second vane carrier 14, respectively. However, this is only one example of the present disclosure, and the first component and the second component may correspond to other parts of the gas turbine 1 which need a sealing of a gap therebetween.

Referring to FIGS. 3 to 6, the sealing assembly 100 according to an embodiment of the present disclosure includes a sealing body 110 having a sealing groove 120 formed therein and a sealing protrusion 121 protruding from the sealing body 110. An insertion hole 14a may be formed in the second vane carrier 14. The sealing assembly 100 is inserted into the insertion hole 14a. As a plurality of the sealing bodies 110 are coupled to each other along the circumferential direction C, a single ring-shaped sealing assembly 100 is formed. Of course, the insertion hole 14a is also formed in a ring-shape in the second vane carrier 14 to correspond to the shape of the sealing assembly 100.

The sealing protrusion 121 protrudes toward one circumferential side (in the circumferential direction C) from the sealing body 110. Further, the sealing groove 120 is formed on the other circumferential side (in the circumferential direction C) of the sealing body 110. For example, if one circumferential side refers to a side of the sealing body 110 which is in the clockwise direction of the circumferential direction C, the other circumferential side refers to the other side of the sealing body 110 which is in the counterclockwise direction of the circumferential direction C. If there are two adjacent sealing bodies 110 along the circumferential direction C, the sealing protrusion 121 of a first sealing body 110 is inserted into a sealing groove 120 of a second body part 110. As such, since the plurality of sealing bodies 110 are coupled to each other such that the sealing protrusions 121 of the sealing bodies 100 are respectively inserted into the sealing grooves 120 of the adjacent sealing bodies 100, the sealing assembly 100 may more closely seal a gap between the first vane carrier 12 and the second vane 14 disposed adjacent to each other.

Referring to FIGS. 4 and 5, according to an embodiment, the sealing protrusion 121 may have a radially (R) outer surface spaced apart inward from a radially (R) outer surface of the sealing body, and a radially (R) inner surface integrally connected to a radially (R) inner surface of the sealing body. In addition, in the sealing protrusion 121, a surface of the sealing protrusion 121 facing the first vane carrier 12 may be integrally connected to a surface of the sealing body 110 facing the first vane carrier 12, and a surface of the sealing protrusion 121 facing the second vane carrier 14 is spaced apart from a surface of the sealing body 110 facing the second vane carrier 14. Referring to FIG. 6, the sealing groove 120 may be disposed and formed in an corresponding and opposite way, in terms of the shape, the size and the direction, to the sealing protrusion 121 of another sealing body 110 adjacent to the sealing body 110 in the circumferential direction C.

According to an embodiment, the sealing body 110 may include a first body part 111 and a second body part 112. The first body part 111 may be provided with the sealing protrusion 121. The second body part 112 may be integrally formed by protruding outward from the first body part 111 in the radial direction R. According to an embodiment, the surface of the second body part 112 facing the first vane carrier 12 may be spaced apart from the surface of the first body part 111 facing the first vane carrier 12, and the surface of the second body part 112 facing the second vane carrier 14 may be integrally connected to the surface of the first body part 111 facing the second vane carrier 14.

In the sealing assembly 100 according to an embodiment of the present invention, the sealing body 110 may be provided with at least one of a first chamfered surface 130, a second chamfered surface 131, a third chamfered surface 132, a fourth chamfered surface 133, a fifth chamfered surface 134, a first fillet surface 140, and a second fillet surface 141.

According to an embodiment, the first chamfered surface 130 may be formed at a radially (R) inner edge portion of the first vane carrier 12 side of the sealing body 110 and the sealing protrusion 121 along the circumferential direction. The second chamfered surface 131 may be formed at an edge portion on a radially (R) outer and circumferential (C) side of the sealing protrusion 121. The third chamfered surface 132 may be formed at an edge portion of an inner wall of the sealing groove 120 that faces the second chamfered surface 131. The fourth chamfered surfaces 133 may be formed at a radially (R) outer edge portion of the first vane carrier 12 side in the first body part 111 and a radially (R) inner edge portion of the second vane carrier 14 side in the first body part 111. The fifth chamfered surface 134 may be formed at a radially (R) outer edge portion in the second body part 112.

The first fillet surface 140 may be formed at a connection portion with the sealing body 110 in the sealing protrusion 121. The second fillet surface 141 may be formed on the surface having the sealing groove 120 in the sealing body 110 that is corresponding and opposite to the first fillet surface 140.

Due to the presence of the first to fifth chamfered surfaces 130, 131, 132, 133, 134, and first and second fillet surfaces 140 and 141, the sealing protrusion 121 and the sealing groove 120, and the adjacent sealing bodies 110 may be not only easily coupled to each other, but also may produce more effective sealing performance between the adjacent first vane carrier 12 and the second vane carrier 14.

Although the present disclosure has been described with reference to the embodiments illustrated in the drawings, the described embodiments are merely illustrative, so those skilled in the art will understand that various modifications and equivalents thereof can be made therefrom. Therefore, the true technical scope of the present disclosure should be determined by the technical spirit of the appended claims.

The invention claimed is:

1. A sealing apparatus comprising:
   a tie rod extending in an axial direction from upstream to downstream;
   a radial direction extending outward from the axial direction perpendicularly;
   a ring-shaped sealing assembly encircling the tie rod and defining a circumferential direction that follows a contour of the ring-shaped sealing assembly; and
   a first component and a second component,
   wherein the ring-shaped sealing assembly comprises a plurality of sealing bodies configured to be coupled to each other in the circumferential direction to form the ring-shaped sealing assembly,
   wherein a sealing body of the plurality of sealing bodies is formed in a segmented ring shape, is configured to be inserted into an insertion hole of the second component adjacent to the first component, and extends from a first circumferential end to a second circumferential end in the circumferential direction,
   wherein the sealing body includes a first body part and a second body part, both are substantially rectangular when viewed from the circumferential direction, the second body part protrudes outward from the first body part in the radial direction, a surface of the second body part facing the first component forms a substantially right angle with an outermost radial surface of the first body part, the substantially right angle spans from the first circumferential end to the second circumferential end, and a surface of the second body part facing downstream in the axial direction flushes with a surface of the first body part facing downstream in the axial direction,
   wherein a sealing protrusion is formed on the first circumferential end of the sealing body, protrudes toward the circumferential direction from the sealing body, and is configured to be inserted into a sealing groove formed on the second circumferential end of an adjacent sealing body,
   wherein an outermost radial surface of the second body part is positioned radially outward compared to the outermost radial surface of the first body part, and the outermost radial surface of the first body part is positioned radially outward compared to an outermost radial surface of the sealing protrusion.

2. The sealing apparatus according to claim 1,
   wherein an innermost radial surface of the sealing protrusion flushes with an innermost radial surface of the first sealing body, and an upstream surface of the sealing protrusion facing the first component flushes with a surface of the first sealing body facing the first component, and
   wherein a sealing groove is disposed, on the second circumferential end of the sealing body, being corresponding and opposite to the sealing protrusion of the sealing body, being configured to receive a sealing protrusion of the adjacent sealing body adjacent to the sealing body.

3. The sealing apparatus according to claim 1, wherein a first chamfered surface is formed on the sealing body and the sealing protrusion at a radially inner edge portion toward the first component along the circumferential direction.

4. The sealing apparatus according to claim 1, wherein the sealing protrusion has a second chamfered surface formed on one edge portion of a radially outer and circumferential end, and the sealing groove has a third chamfered surface formed at an edge portion of an inner wall corresponding and opposite to the second chamfered surface.

5. The sealing apparatus according to claim 1, wherein the sealing protrusion has a first fillet surface formed at a connection portion thereof with the sealing body, and the sealing body has a second fillet surface formed on a surface thereof on the side where the sealing groove is formed, corresponding and opposite to the first fillet surface.

6. The sealing apparatus according to claim 1, wherein the first body part has fourth chamfered surfaces formed at a radially outer edge portion thereof toward the first component and a radially inner edge portion thereof toward the second component, along the circumferential direction, respectively.

7. The sealing apparatus according to claim 1, wherein the second body part has a fifth chamfered surface formed at a radially outer edge portion thereof along the circumferential direction.

8. A turbomachine comprising:
a stator configured to guide a fluid passing therethrough;
a rotor disposed in the stator configured to rotate with the fluid passing through the stator,
a tie rod extending in an axial direction from upstream to downstream; and
wherein the stator comprises:
a casing;
first and second vane carriers disposed on a radially inner side of the casing so as to be arranged adjacent to each other along the axial direction;
vanes respectively coupled to inner circumferential surfaces of the first and second vane carriers; and
a sealing assembly formed in a ring shape, encircling the tie rod, defining a circumferential direction that follows a contour of the sealing assembly and sealing a gap between the first and second vane carriers,
wherein the sealing assembly comprises a plurality of sealing bodies configured to be coupled to each other in the circumferential direction to form the sealing assembly,
wherein a sealing body of the plurality of sealing bodies is formed in a segmented ring shape, is configured to be inserted into an insertion hole of the second vane carrier adjacent to the first vane carrier, and extends from a first circumferential end to a second circumferential end in the circumferential direction,
wherein the sealing body includes a first body art and a second body part, both are substantially rectangular when viewed from the circumferential direction, the second body part protrudes outward from the first body part in the radial direction, a surface of the second body part facing the first component forms a substantially right angle with an outermost radial surface of the first body part, the substantially right angle spans from the first circumferential end to the second circumferential end, and a surface of the second body part facing downstream in the axial direction flushes with a surface of the first body part facing downstream in the axial direction,
wherein a sealing protrusion is formed on the first circumferential end of the sealing body, protrudes toward the circumferential direction from the sealing body, and is configured to be inserted into a sealing groove formed on the second circumferential end of an adjacent sealing body,
wherein an outermost radial surface of the second body part is positioned radially outward compared to the outermost radial surface of the first body part, and the outermost radial surface of the first body part is positioned radially outward compared to an outermost radial surface of the sealing protrusion.

9. The turbomachine according to claim 8,
wherein an innermost radial surface of the sealing protrusion flushes with an innermost radial surface of the first sealing body, and an upstream surface of the sealing protrusion facing the first component flushes with a surface of the first sealing body facing the first component, and
wherein the sealing groove is disposed, on the second circumferential end of the sealing body, being corresponding and opposite to the sealing protrusion of the sealing body, being configured to receive a sealing protrusion of the adjacent sealing body adjacent to the sealing body.

10. The turbomachine according to claim 8, wherein a first chamfered surface is formed on the sealing body and the sealing protrusion at a radially inner edge portion toward the first vane carrier along the circumferential direction.

11. The turbomachine according to claim 8, wherein the sealing protrusion has a second chamfered surface formed on one edge portion of a radially outer and circumferential end, and the sealing groove has a third chamfered surface formed at an edge portion of an inner wall corresponding and opposite to the second chamfered surface.

12. The turbomachine according to claim 8, wherein the sealing protrusion has a first fillet surface formed at a connection portion thereof with the sealing body, and the sealing body has a second fillet surface formed on a surface thereof on the side where the sealing groove is formed, corresponding and opposite to the first fillet surface.

13. The turbomachine according to claim 8, wherein the first body part has fourth chamfered surfaces formed at a radially outer edge portion thereof toward the first vane carrier and a radially inner edge portion thereof toward the second vane carrier, along the circumferential direction, respectively.

14. The turbomachine according to claim 8, wherein the second body part has a fifth chamfered surface formed at a radially outer edge portion thereof along the circumferential direction.

15. A stator of a turbomachine comprising:
a casing;
a rotational axis of the casing extending an axial direction from upstream to downstream;
a radial direction extending outward from the axial direction perpendicularly;
first and second vane carriers disposed on a radially inner side of the casing so as to be arranged adjacent to each other along the axial direction;
vanes respectively coupled to inner circumferential surfaces of the first and second vane carriers; and
a sealing assembly formed in a ring, encircling the rotational axis, defining a circumferential direction that follows a contour of the sealing assembly, and sealing a gap between the first and second vane carriers,
wherein the sealing assembly comprises a plurality of sealing bodies configured to be coupled to each other in the circumferential direction to form the sealing assembly, wherein a sealing body of the plurality of sealing bodies is formed in a segmented ring shape, is configured to be inserted into an insertion hole of the second vane carrier adjacent to the first vane carrier, and extends from a first circumferential end to a second circumferential end in the circumferential direction, wherein the sealing body includes a first body art and a second body part, both are substantially rectangular when viewed from the circumferential direction, the second body part protrudes outward from the first body part in the radial direction, a surface of the second body part facing the first component forms a substantially right angle with an outermost radial surface of the first body part, the substantially right angle spans from the first circumferential end to the second circumferential end, and a surface of the second body part facing downstream in the axial direction flushes with a surface of the first body part facing downstream in the axial direction, wherein a sealing protrusion is formed on the first circumferential end of the sealing body, protrudes toward the circumferential direction from the sealing body, and is configured to be inserted into a sealing groove formed on the second circumferential end of an adjacent sealing body, wherein an outermost radial surface of the second body part is positioned radially outward compared to the outermost radial surface of the surface of the first body part, and the outermost radial surface of the first body part is positioned radially outward compared to an outermost radial surface of the sealing protrusion.

16. The stator according to claim 15, wherein an innermost radial surface of the sealing protrusion flushes with an innermost radial surface of the first sealing body, and an upstream surface of the sealing protrusion facing the first component flushes with a surface of the first sealing body facing the first component, and wherein the sealing groove is disposed, on the second circumferential side of the sealing body, being corresponding and opposite to the sealing protrusion of the sealing body, being configured to receive a sealing protrusion of the adjacent sealing body adjacent to the sealing body.

17. The stator according to claim 15, wherein a first chamfered surface is formed on the sealing body and the sealing protrusion at a radially inner edge portion on the first vane carrier side along the circumferential direction, and the sealing protrusion has a second chamfered surface formed on one edge portion of a radially outer and circumferential end, and the sealing groove has a third chamfered surface formed at an edge portion of an inner wall corresponding and opposite to the second chamfered surface.

* * * * *